US012722937B2

(12) United States Patent
Guo et al.

(10) Patent No.: US 12,722,937 B2
(45) Date of Patent: Sep. 1, 2026

(54) ELEVATOR SYSTEM INCLUDING WIRELESS POWER TRANSFER

(71) Applicant: OTIS ELEVATOR COMPANY, Farmington, CT (US)

(72) Inventors: Ben Guo, West Hartford, CT (US); Hua Zhou, Farmington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1503 days.

(21) Appl. No.: 17/061,960

(22) Filed: Oct. 2, 2020

(65) Prior Publication Data

US 2022/0106155 A1 Apr. 7, 2022

(51) Int. Cl.

| | |
|---|---|
| ***B66B 1/34*** | (2006.01) |
| ***B66B 1/30*** | (2006.01) |
| ***B66B 1/52*** | (2006.01) |
| ***B66B 7/00*** | (2006.01) |
| ***B66B 11/02*** | (2006.01) |
| ***B66B 11/04*** | (2006.01) |
| ***H02J 9/06*** | (2006.01) |
| ***H02J 50/80*** | (2016.01) |

(52) U.S. Cl.

CPC .............. *B66B 1/3461* (2013.01); *B66B 1/30* (2013.01); *B66B 1/3446* (2013.01); *B66B 1/52* (2013.01); *B66B 7/00* (2013.01); *B66B 11/0226* (2013.01); *B66B 11/043* (2013.01); *H02J 9/06* (2013.01); *H02J 50/80* (2016.02); *B66B 2201/4623* (2013.01)

(58) Field of Classification Search

CPC .................................................... B66B 1/3461

See application file for complete search history.

(56) References Cited

U.S. PATENT DOCUMENTS 6,412,604 B1 * 7/2002 Schuster ............. B66B 11/0407 320/108
2002/0023802 A1 * 2/2002 Ayano ..................... B66B 1/461 187/290
2009/0127029 A1 * 5/2009 Oesterle .................. B66B 5/021 187/289

(Continued)

FOREIGN PATENT DOCUMENTS

CN 101902081 B * 10/2013
JP 2012184049 A * 9/2012

(Continued)

*Primary Examiner* — Laert Dounis

(74) *Attorney, Agent, or Firm* — Carlson, Gaskey & Olds, P.C.

(57) ABSTRACT

An illustrative example embodiment of an elevator system includes an elevator car, a first transceiver supported on the elevator car, and a second transceiver in a preselected location where the first transceiver can wirelessly communicate with the second transceiver when the elevator car is situated in a corresponding location. The first transceiver wirelessly communicates with the second transceiver to transfer at least electrical power between the transceivers. An elevator car power storage device is supported on the elevator car. The elevator car power storage device is configured to store electrical power received by the first transceiver from the second transceiver. The elevator car power storage device is also configured to provide power to the first transceiver to be transferred to the second transceiver.

22 Claims, 1 Drawing Sheet

(56) References Cited

U.S. PATENT DOCUMENTS

| | | | | |
|---|---|---|---|---|
| 2010/0187045 | A1* | 7/2010 | Ishikawa | B66B 1/34 187/290 |
| 2015/0314984 | A1* | 11/2015 | McCarthy | H02J 50/50 187/413 |
| 2017/0057780 | A1* | 3/2017 | Nguyen | H04B 5/263 |
| 2020/0195046 | A1* | 6/2020 | Manes | H02J 50/80 |
| 2020/0195047 | A1* | 6/2020 | Manes | B66B 11/0226 |

FOREIGN PATENT DOCUMENTS

| | | | | | |
|---|---|---|---|---|---|
| JP | 2019156545 | A | * | 9/2019 | |
| WO | WO-02057171 | A1 | * | 7/2002 | B66B 1/30 |

* cited by examiner

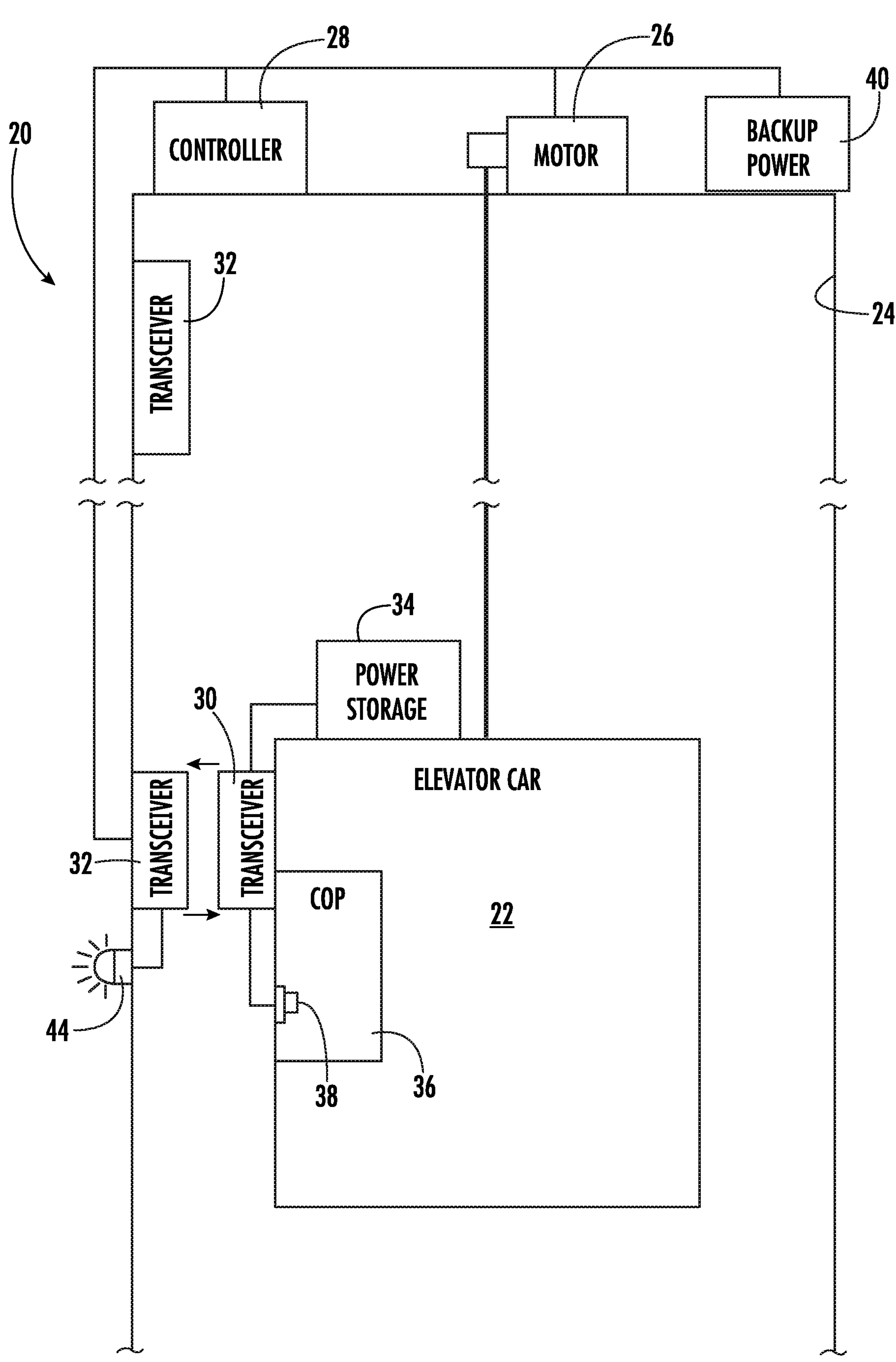
28
26
40
20
CONTROLLER
MOTOR
BACKUP
POWER
TRANSCEIVER
32
24
34
POWER
STORAGE
30
ELEVATOR CAR
TRANSCEIVER
TRANSCEIVER
32
COP
22
44
38
36

ELEVATOR SYSTEM INCLUDING WIRELESS POWER TRANSFER

BACKGROUND

Elevator systems are in widespread use for carrying passengers between various levels in buildings, for example. Typical elevator systems include an elevator car situated within a hoistway. A machine uses electrical power to move the elevator car and control the position of the car within the hoistway. A controller controls operation of the machine.

In traditional elevator systems, communications between the car operating panel in the elevator car and the controller occur over a hardwired connection established through a traveling cable associated with the elevator car. The traveling cable typically also acts as a conduit for electrical power to be supplied to the components of the elevator car, such as the lighting, door and car operating panel.

Traditional elevator system configurations, including a traveling cable, have costs associated with them. For example, a traveling cable introduces additional material cost and other portions of the elevator system have to be configured to accommodate the traveling cable. Eliminating a travelling cable, however, is not possible without making some other modification to an elevator system to facilitate power supply and communications with components of the elevator car.

SUMMARY

An illustrative example embodiment of an elevator system includes an elevator car, a first transceiver supported on the elevator car, and a second transceiver in a preselected location where the first transceiver can wirelessly communicate with the second transceiver when the elevator car is situated in a corresponding location. The first transceiver wirelessly communicates with the second transceiver to wirelessly transfer at least electrical power between the transceivers. An elevator car power storage device is supported on the elevator car. The elevator car power storage device is configured to store electrical power received by the first transceiver from the second transceiver. The elevator car power storage device is also configured to provide power to the first transceiver to be transferred to the second transceiver.

In addition to one or more of the features described above, or as an alternative, the elevator system includes a plurality of second transceivers in respective preselected locations, each of the second transceivers being configured to wirelessly communicate with the first transceiver when the elevator car is in a respective corresponding location.

In addition to one or more of the features described above, or as an alternative, the elevator system includes a backup power storage that is configured to provide power to the elevator system under selected conditions, wherein the backup power storage is configured to receive power from the elevator car power storage device that is wirelessly transferred from the first transceiver to the second transceiver.

In addition to one or more of the features described above, or as an alternative, the elevator system includes a machine including a motor configured to move the elevator car, and a controller configured to control operation of the motor. The backup power storage provides power to the controller and the machine during a power failure of a main power supply.

In addition to one or more of the features described above, or as an alternative, the elevator car power storage device is configured to provide power to at least one electrically powered component of the elevator car.

In addition to one or more of the features described above, or as an alternative, the elevator system includes a passenger interface supported on the elevator car and wherein the elevator car power storage device provides power to the passenger interface.

In addition to one or more of the features described above, or as an alternative, the first transceiver and the second transceiver are configured to wirelessly communicate signals between the transceivers and the first transceiver wirelessly transfers at least one signal from at least one component on the elevator car to the second transceiver.

In addition to one or more of the features described above, or as an alternative, the elevator system includes at least one passenger interface that is configured to generate at least one signal indicating a request of a passenger on the elevator car and wherein the first transceiver transfers a signal generated by the at least one passenger interface to the second transceiver.

In addition to one or more of the features described above, or as an alternative, the at least one passenger interface is configured to allow the passenger to request elevator service to a selected destination or to request emergency service.

In addition to one or more of the features described above, or as an alternative, the elevator car power storage device includes a battery.

An illustrative example embodiment of a method of powering an elevator system includes wirelessly transferring power between a first transceiver supported on an elevator car and a second transceiver in a preselected location where the first transceiver can wirelessly communicate with the second transceiver when the elevator car is situated in a corresponding location, storing power transferred from the second transceiver to the first transceiver in an elevator car power storage device supported on the elevator car when the elevator system is in a first condition, and transferring power from the elevator car power storage device through the first transceiver to the second transceiver when the elevator system is in a second condition.

In addition to one or more of the features described above, or as an alternative, the first condition includes the elevator system receiving power from a power supply outside of the elevator system and the second condition includes a failure of the power supply.

In addition to one or more of the features described above, or as an alternative, the method includes providing power to a backup power storage when the elevator system is in the second condition, wherein the backup power storage is configured to receive power from the elevator car power storage device that is wirelessly transferred from the first transceiver to the second transceiver.

In addition to one or more of the features described above, or as an alternative, the elevator system includes a machine having a motor configured to move the elevator car and a controller configured to control operation of the motor, and the method includes providing power from the backup power storage to the controller and the machine when the elevator system is in the second condition.

In addition to one or more of the features described above, or as an alternative, the method includes providing power from the elevator car power storage device to at least one electrically powered component of the elevator car.

In addition to one or more of the features described above, or as an alternative, the elevator system includes a passenger interface supported on the elevator car and the method includes providing power from the elevator car power storage device to the passenger interface.

In addition to one or more of the features described above, or as an alternative, the method includes wirelessly communicating signals between the first transceiver and the second transceiver including transferring at least one signal from at least one component on the elevator car through the first transceiver to the second transceiver.

In addition to one or more of the features described above, or as an alternative, the elevator system includes at least one passenger interface that is configured to generate at least one signal indicating a request of a passenger on the elevator car and the method includes transferring a signal generated by the at least one passenger interface through the first transceiver to the second transceiver.

In addition to one or more of the features described above, or as an alternative, the at least one passenger interface is configured to allow the passenger to request elevator service to a selected destination or to request emergency service.

In addition to one or more of the features described above, or as an alternative, the elevator car power storage device includes a battery.

The various features and advantages of at least one disclosed example embodiment will become apparent to those skilled in the art from the following detailed description. The drawings that accompany the detailed description can be briefly described as follows.

BRIEF DESCRIPTION OF THE DRAWING

FIG. 1 schematically illustrates selected portions of an elevator system including bi-directional wireless power transfer designed according to an example embodiment.

DETAILED DESCRIPTION

FIG. 1 schematically illustrates selected portions of an illustrative example elevator system 20. An elevator car 22 is situated within a hoistway 24. A machine 26, including a motor and brake, operates responsive to a controller 28 to control the position and movement of the elevator car 22 within the hoistway 24. The manner in which the elevator car 22 is situated within the hoistway 24 and the mechanism by which it is propelled along the hoistway may vary depending on the particular embodiment and such details are not provided to maintain simplicity of the schematic illustration.

A first transceiver 30 is supported on the elevator car 22. The first transceiver 30 is configured to wirelessly communicate with a second transceiver 32 that is at a preselected location relative to the hoistway 24. In the illustrated example embodiment, the second transceiver 32 is situated within the hoistway 24. Other arrangements are possible. When the elevator car 22 is situated in a corresponding location where the first transceiver 30 and second transceiver 32 are within an acceptable communication distance for wireless communications between them, the transceivers 30, 32 can wirelessly communicate with each other to transfer electrical power, data or other signals between the transceivers 30, 32.

The transceivers 30 and 32 are configured for bi-directional wireless communications. In other words, some communications are from the first transceiver 30 to the second transceiver 32 and others are from the second transceiver 32 to the first transceiver 30.

The illustrated example embodiment includes a plurality of second transceivers 32 situated in different, respective locations along the hoistway 24 so that wireless communication between the first transceiver 30 and a corresponding second transceiver 32 is possible when the elevator car 22 is at an appropriate location within the hoistway 24. In some embodiments, a second transceiver 32 is positioned near each expected location of the elevator car 22 when the elevator car 22 is parked at a landing where elevator service is available to passengers. The number of second transceivers 32 and the location of each may vary to suit the needs of a particular installation.

A power storage device 34 is supported on the elevator car 22. The power storage device 34 in some embodiments comprises a battery. For example, the power storage device 34 can be a rechargeable lithium ion battery in some embodiments. Other embodiments include a power storage device 34 that is based on at least one of electrical, electromagnetic, electrochemical, or chemical technology. For example, the power storage device 34 may include capacitors, supercapacitors, superconducting magnetic energy storage coils, a flow battery, or a combination of such devices.

The power storage device 34 is configured to provide power to components on the elevator car 22 that require electrical power. For example, in FIG. 1 a car operating panel (COP) 36 includes a passenger interface that allows a passenger to make a request for service from the elevator system 20. The car operating panel 36 may include, for example, a touchscreen or series of buttons that allow a passenger to indicate a desired destination. In the illustrated example, the car operating panel 36 includes an emergency request button 38 that allows a passenger to request emergency service if the elevator car 22 were to unexpectedly stop in the hoistway 24 in a position where the passenger was not able to exit the elevator car 22. The emergency request button 38 may be a physical button or may be an image on a touchscreen.

Signals from the car operating panel 36 may be transmitted by the first transceiver 30 to the second transceiver 32 to then be communicated to the controller 28 that responsively causes appropriate operation of the machine 26 to provide desired elevator service. Signal communication from the second transceiver 32 to the first transceiver 30 may be used, for example, to control operation of one or more components of the elevator car 22, such as a door mover to open or close the doors.

The elevator system 20 has a first operating condition in which power supply to the elevator system 20 is available from a main power supply, such as a building power supply or power grid operated by a utility company. In the first condition, power from the main power supply is transferred from the second transceiver 32 to the first transceiver 30 so that the power storage device 34 may store such power. This transfer of power from the second transceiver 32 to the first transceiver 30 keeps the power storage device 34 properly charged to be able to power components on the elevator car 22, such as the car operating panel 36, lighting, a door mover for opening and closing the doors, a ventilation fan, etc.

A second operating condition of the elevator system 20 occurs when the main power supply is unavailable, such as during a power outage. In the second condition, a backup power supply 40 provides power to the machine 26 and controller 28 and other portions of the elevator system 20. The backup power supply 40 may be a generator, a battery or another power storage device that is based on at least one of electrical, electromagnetic, electrochemical, mechanical, or chemical technology. For example, the backup power supply 40 may include capacitors, supercapacitors, superconducting magnetic energy storage coils, a flow battery, a flywheel, compressed fluid, a temperature storage medium, or a combination of more than one of these. In the second condition, the first transceiver 30 can transfer power from the power storage device 34 to the second transceiver 32 to provide additional power to the backup power supply 40 when needed. For example, if the backup power supply 40 is drained, is becoming depleted, or has insufficient reserve to continue a desired level of elevator system operation, power from the power storage device 34 can be used to increase the power of the backup power supply 40.

Additionally, during the second condition, a passenger in the elevator car 22 may use the emergency request button 38 to indicate a desire to notify someone that the elevator car 22 has stopped, for example, and that the passenger cannot exit the elevator car 22. The first transceiver 30 wirelessly communicates a signal based on operation of the emergency request button 38 to the second transceiver 32, which communicates that signal to the controller 28 or a remotely located monitoring center. The controller 28 may respond to such a signal by causing the elevator car 22 to move to a nearby landing or to open the car doors if the elevator car 22 is already situated at an appropriate landing.

The illustrated example embodiment includes an emergency request indicator 44 that indicates use of the emergency request button 38. The indictor 44 is schematically shown as a physical indicator that may be situated at various locations in the building that includes the elevator system 20. For example, the indicator 44 may be in a pit or machine room of the elevator system 20 where a mechanic or service personnel would observe the indication when arriving at the site of the elevator system 20 to address the second condition. Alternatively, the indicator 44 schematically represents a communication that is sent to a remote location where appropriate personnel are alerted to the need to communicate with the passenger in the elevator car 22 or to otherwise take action so that the elevator car 22 can be moved to an appropriate position and the doors can be opened so the passenger can exit the car. Communications with the passenger in the elevator car 22 under the second condition may occur through wireless communications between the second transceiver 32 and the first transceiver 30.

The illustrated example elevator system 20 and other embodiments include bi-directional wireless communication between the elevator car 22 and at least one device strategically positioned along the travel path of the elevator car 22, which may include several, respective locations in the hoistway 24. The bi-directional communication allows for bi-directional power transfer between the power storage device 34 and the backup power supply 40. The bi-directional communication also allows for data or signal communications between passengers on the elevator car 22 or components of the elevator car 22 and other portions of the elevator system 20, such as the controller 28, or remote locations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:

an elevator car;

a first transceiver supported on the elevator car;

a second transceiver in a preselected location where the first transceiver can wirelessly communicate with the second transceiver when the elevator car is situated in a corresponding location, the first transceiver wirelessly communicating with the second transceiver to transfer at least electrical power between the first and the second transceivers;

an elevator car power storage device supported on the elevator car, the elevator car power storage device being configured to store electrical power received by the first transceiver from the second transceiver, the elevator car power storage device also being configured to provide power to the first transceiver to be transferred to the second transceiver;

when in a first operating condition, power supply to the elevator system is available from a main utility power supply, and wherein power is transferred from the main utility power supply through the second transceiver to the first transceiver to charge the elevator car power storage device and power components on the elevator car;

when in a second operating condition, the main utility power supply is unavailable and a backup power supply, separate from the elevator car power storage device and separate from the main utility power supply, powers components on the elevator car, and wherein the first transceiver transfers power from the elevator car power storage device to the second transceiver to provide additional power to the backup power supply; and wherein the backup power supply powers components on the elevator car while simultaneously receiving additional power transferred from the elevator car power storage device from the first transceiver to the second transceiver.

2. The elevator system of claim 1, comprising a plurality of second transceivers in respective preselected locations, each of the second transceivers being configured to wirelessly communicate with the first transceiver when the elevator car is in a respective corresponding location.

3. The elevator system of claim 1, comprising a machine including a motor configured to move the elevator car, and a controller configured to control operation of the motor, wherein the backup power supply provides power to the controller and the machine during a power failure of the main utility power supply, and wherein, if the backup power supply is drained, is becoming depleted, or has insufficient reserve to continue a desired level of elevator system operation, power from the elevator car power storage device is used to increase power of the backup power supply.

4. The elevator system of claim 1, wherein the elevator car power storage device is configured to provide power to at least one electrically powered component of the elevator car.

5. The elevator system of claim 4, comprising a passenger interface supported on the elevator car and wherein the elevator car power storage device provides power to the passenger interface.

6. The elevator system of claim 1, wherein the first transceiver and the second transceiver are configured to wirelessly communicate signals between the first and second transceivers, and the first transceiver wirelessly transfers at least one signal from at least one component on the elevator car to the second transceiver.

7. The elevator system of claim 6, comprising at least one passenger interface that is configured to generate at least one signal indicating a request of a passenger on the elevator car and wherein the first transceiver transfers a signal generated by the at least one passenger interface to the second transceiver.

8. The elevator system of claim 7, wherein the at least one passenger interface is configured to allow the passenger to request elevator service to a selected destination or to request emergency service.

9. The elevator system of claim 1, wherein the elevator car power storage device comprises a battery.

10. The elevator system of claim 1, wherein the first transceiver and the second transceiver provide bi-directional wireless communication therebetween, and wherein the first transceiver and the second transceiver provide bi-directional power transfer between the elevator car power storage device and a backup power supply.

11. The elevator system of claim 1, wherein: when in the second operating condition where the main utility power supply is unavailable, the elevator car includes:

an emergency request button that is actuatable to indicate an emergency condition, wherein in accordance with a signal generated by operation of the emergency request button, the first transceiver wirelessly communicates the signal to the second transceiver which communicates the signal to a controller and/or a remotely located monitoring center, and wherein in accordance with a receipt of the signal the controller causes the elevator car to move to a nearby landing or to open car doors if the elevator car is already situated at an appropriate landing; and an emergency request indicator that indicates use of the emergency request button, wherein the emergency request indicator comprises a physical indicator situated at one or more locations in a building that includes the elevator system, and/or a communication that is sent to a remote location to alert personnel to take action.

12. A method of powering an elevator system, the method comprising:

wirelessly transferring power between a first transceiver supported on an elevator car and a second transceiver in a preselected location where the first transceiver can wirelessly communicate with the second transceiver when the elevator car is situated in a corresponding location;

storing power transferred from the second transceiver to the first transceiver in an elevator car power storage device supported on the elevator car when the elevator system is in a first condition;

transferring power from the elevator car power storage device through the first transceiver to the second transceiver when the elevator system is in a second condition;

when in the first condition, power supply to the elevator system is available from a main utility power supply, and including transferring power from the main utility power supply through the second transceiver to the first transceiver to charge the elevator car power storage device and power components on the elevator car;

when in the second condition, the main utility power supply is unavailable and a backup power supply, separate from the elevator car power storage device and separate from the main utility power supply, powers components on the elevator car, and including using the first transceiver to transfer power from the elevator car power storage device to the second transceiver to provide additional power to the backup power supply; and providing power to the backup power supply such that the backup power supply powers components on the elevator car while simultaneously receiving additional power transferred from the elevator car power storage device from the first transceiver to the second transceiver.

13. The method of claim 12, wherein the first condition includes the elevator system receiving power from a power supply outside of the elevator system and the second condition includes a failure of the power supply.

14. The method of claim 12, wherein the elevator system includes a machine having a motor configured to move the elevator car and a controller configured to control operation of the motor, and the method comprises providing power from the backup power supply to the controller and the machine when the elevator system is in the second condition, and wherein, if the backup power supply is drained, is becoming depleted, or has insufficient reserve to continue a desired level of elevator system operation, power from the elevator car power storage device is used to increase power of the backup power supply.

15. The method of claim 12, comprising providing power from the elevator car power storage device to at least one electrically powered component of the elevator car.

16. The method of claim 15, wherein the elevator system comprises a passenger interface supported on the elevator car and the method comprises providing power from the elevator car power storage device to the passenger interface.

17. The method of claim 12, comprising wirelessly communicating signals between the first transceiver and the second transceiver including transferring at least one signal from at least one component on the elevator car through the first transceiver to the second transceiver.

18. The method of claim 17, wherein the elevator system includes at least one passenger interface that is configured to generate at least one signal indicating a request of a passenger on the elevator car and the method comprises transferring a signal generated by the at least one passenger interface through the first transceiver to the second transceiver.

19. The method of claim 18, wherein the at least one passenger interface is configured to allow the passenger to request elevator service to a selected destination or to request emergency service.

20. The method of claim 12, wherein the elevator car power storage device comprises a battery.

21. The method of claim 12, including bi-directional wireless communication between the first transceiver and the second transceiver, and including using the first transceiver and the second transceiver to provide bi-directional power transfer between the elevator car power storage device and a backup power supply.

22. The method of claim 12, wherein:

when in the second condition where the main utility power supply is unavailable; the elevator car includes:

an emergency request button that is actuatable to indicate an emergency condition, wherein in accordance with a signal generated by operation of the emergency request button, the first transceiver wirelessly communicates the signal to the second transceiver which communicates the signal to a controller and/or a remotely located monitoring center, and wherein in accordance with a receipt of the signal the controller causes the elevator car to move to a nearby landing or to open car doors if the elevator car is already situated at an appropriate landing; and an emergency request indicator that indicates use of the emergency request button, wherein the emergency request indicator comprises a physical indicator situated at one or more locations in a building that includes the elevator system, and/or a communication that is sent to a remote location to alert personnel to take action.

* * * * *